(12) United States Patent
Li et al.

(10) Patent No.: US 9,485,829 B2
(45) Date of Patent: *Nov. 1, 2016

(54) ALTERNATING CURRENT RECTIFYING CIRCUIT AND ALTERNATING CURRENT RECTIFYING METHOD FOR DRIVING LED MODULE

(71) Applicant: SICHUAN SUNFOR LIGHT CO., LTD., Sichuan (CN)

(72) Inventors: Dongming Li, Sichuan (CN); Zhengyong Feng, Sichuan (CN); Wentao Long, Sichuan (CN); Mian Yang, Sichuan (CN)

(73) Assignee: SICHUAN SUNFOR LIGHT CO., LTD., Sichuan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/048,728

(22) Filed: Feb. 19, 2016

(65) Prior Publication Data

US 2016/0174330 A1 Jun. 16, 2016

(30) Foreign Application Priority Data

Jan. 31, 2013 (CN) .......................... 2013 1 0037178

(51) Int. Cl.
*H05B 33/08* (2006.01)
*H02H 7/125* (2006.01)
*H02M 7/06* (2006.01)

(52) U.S. Cl.
CPC ........ *H05B 33/0887* (2013.01); *H02H 7/1252* (2013.01); *H05B 33/0809* (2013.01); *H05B 33/0815* (2013.01); *H05B 33/0851* (2013.01); *H02M 7/062* (2013.01); *H05B 33/0884* (2013.01); *Y02B 20/341* (2013.01)

(58) Field of Classification Search
CPC .......... H05B 33/0809; H05B 33/0824; H05B 33/0803; H05B 37/02; H05B 33/0851; H05B 33/089; H05B 37/021; Y02B 20/342; Y02B 20/341
USPC ..... 315/291, 294, 200 R, 246, 247, 312, 51, 315/297, 307
See application file for complete search history.

(56) References Cited

U.S. PATENT DOCUMENTS

| 8,305,010 B2 | 11/2012 | Kamata et al. | |
| 8,415,889 B2 | 4/2013 | Hiramatsu et al. | |
| 8,569,954 B2* | 10/2013 | Kang | H05B 33/089 315/291 |
| 9,095,014 B2* | 7/2015 | Chen | H05B 37/0263 |

(Continued)

FOREIGN PATENT DOCUMENTS

| CN | 102740538 A | 10/2012 |
| CN | 103152913 A | 6/2013 |

(Continued)

OTHER PUBLICATIONS

International Search Report issued in PCT/CN2013/090328 dated Mar. 27, 2014.

*Primary Examiner* — Haissa Philogene
(74) *Attorney, Agent, or Firm* — Michael Ye; Andrews Kurth Kenyon LLP

(57) ABSTRACT

Disclosed are an alternating current rectifying circuit and an alternating current rectifying method for driving an LED module. By using the present invention, stability of an output voltage can be improved, and luminous efficiency of the LED module can be improved.

20 Claims, 3 Drawing Sheets

(56) References Cited

U.S. PATENT DOCUMENTS

| | | |
|---|---|---|
| 2005/0122062 A1 | 6/2005 | Hsu |
| 2008/0252229 A1 | 10/2008 | Wu |
| 2009/0033241 A1* | 2/2009 | Yu .................... H05B 33/0803 315/277 |
| 2015/0366022 A1* | 12/2015 | Li ...................... H05B 33/0809 315/119 |
| 2015/0373794 A1* | 12/2015 | Li .......................... H05B 37/02 315/200 R |

FOREIGN PATENT DOCUMENTS

| | | |
|---|---|---|
| CN | 103152914 A | 6/2013 |
| CN | 102186283 U | 9/2015 |

* cited by examiner

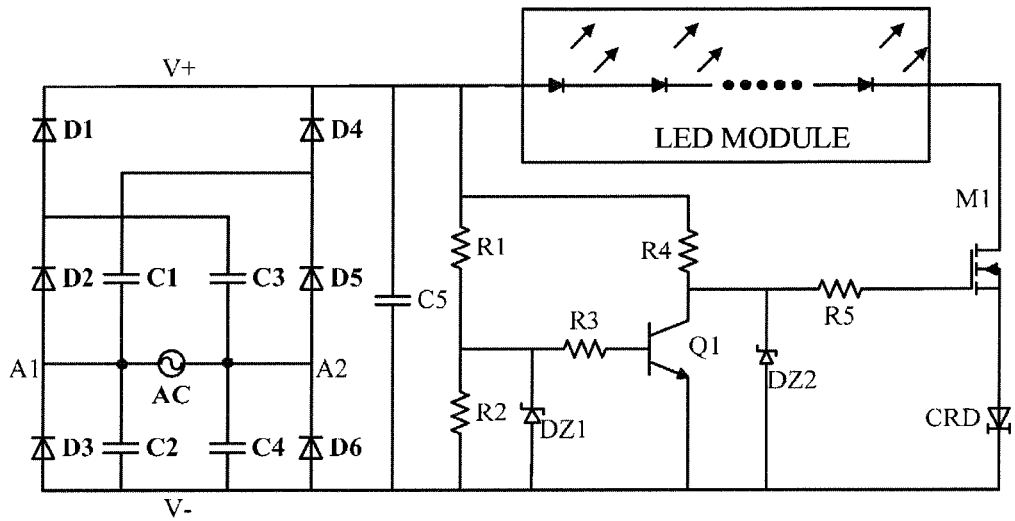

Fig.5

| WHEN THE ALTERNATING CURRENT MODULE IS IN A POSITIVE HALF CYCLE, THE POSITIVE HALF CYCLE RECTIFYING BRANCH RECTIFIES AN ALTERNATING CURRENT OUTPUTTED FROM THE ALTERNATING CURRENT MODULE, AND OUTPUTS THE RECTIFIED VOLTAGE SIGNAL TO THE OVERVOLTAGE PROTECTION BRANCH AND AN EXTERNAL LED MODULE | 601 |

↓

| THE NEGATIVE HALF CYCLE FEEDING BRANCH PERFORMS CHARGING ACCORDING TO THE ALTERNATING CURRENT OUTPUTTED FROM THE ALTERNATING CURRENT MODULE, AND THE POSITIVE HALF CYCLE FEEDING BRANCH PERFORMS DISCHARGING AND OUTPUTS THE DISCHARGED VOLTAGE SIGNAL TO THE OVERVOLTAGE PROTECTION BRANCH AND THE EXTERNAL LED MODULE | 602 |

↓

| THE OVERVOLTAGE PROTECTION BRANCH TURNS OFF AN ELECTRICAL PATH OF THE EXTERNAL LED MODULE WHEN THE INPUTTED VOLTAGE SIGNAL IS HIGHER THAN A PRESET VOLTAGE THRESHOLD | 603 |

↓

| WHEN THE ALTERNATING CURRENT MODULE IS IN THE NEGATIVE HALF CYCLE, THE NEGATIVE HALF CYCLE RECTIFYING BRANCH RECTIFIES THE ALTERNATING CURRENT OUTPUTTED FROM THE ALTERNATING CURRENT MODULE, AND OUTPUTS THE RECTIFIED VOLTAGE SIGNAL TO THE OVERVOLTAGE PROTECTION BRANCH CIRCUIT AND THE EXTERNAL LED MODULE | 604 |

↓

| THE NEGATIVE HALF CYCLE FEEDING BRANCH PERFORMS DISCHARGING, AND OUTPUTS THE DISCHARGED VOLTAGE SIGNAL TO THE OVERVOLTAGE PROTECTION BRANCH AND THE EXTERNAL LED MODULE, AND THE POSITIVE HALF CYCLE FEEDING BRANCH PERFORMS CHARGING ACCORDING TO THE ALTERNATING CURRENT OUTPUTTED FROM THE ALTERNATING CURRENT MODULE | 605 |

↓

| THE OVERVOLTAGE PROTECTION BRANCH TURNS OFF THE ELECTRICAL PATH OF THE EXTERNAL LED MODULE WHEN THE INPUTTED VOLTAGE SIGNAL IS HIGHER THAN THE PRESET VOLTAGE THRESHOLD | 606 |

Fig.6 ated with a positive terminal of the fourth diode D4 and an output
ALTERNATING CURRENT RECTIFYING CIRCUIT AND ALTERNATING CURRENT RECTIFYING METHOD FOR DRIVING LED MODULE This application is a continuation of U.S. patent application Ser. No. 14/762,709, filed on Jul. 22, 2015, which claims priority to PCT Application No. PCT/CN2013/090328, filed on Dec. 24, 2013, and Chinese Patent Application No. 201310037178.9, filed China State Intellectual Property Office on Jan. 31, 2013, titled "Alternating current rectifying circuit and alternating current rectifying method for driving LED module", the entire contents of which are incorporated herein by reference.

TECHNICAL FIELD

The present disclosure relates to the technique of alternating current rectification, and more particularly, to an alternating current rectifying circuit and an alternating current rectifying method for driving an LED (Light Emitting Diode) module.

BACKGROUND

As one kind of new light sources with high-efficiency, LED (Light Emitting Diode) modules are widely applied in illumination in commercial, industrial and domestic fields due to advantages such as a long lifespan, a low energy consumption, energy-saving and environmental protection.

When the LED module acts as a light source of an illumination device, the lifespan of the illumination device not only depends on an illumination performance of the LED, but also depends on stability of driving circuit components for providing a working voltage for the LED module. In conventional application solutions, the bottleneck of the lifespan of the LED module still lies in the stability of the voltage provided by the driving circuit. In order to reduce the influence of fluctuation of the driving voltage to the lifespan of the LED module, it is necessary to design a new alternating current rectifying circuit for providing a stable driving voltage to drive the LED module based on the widely applied alternating current at present.

In a bridge rectifier circuit, semiconductor rectifier diodes (or named diodes) are connected to form a simple rectifying circuit. The bridge rectifier circuit is widely applied in various voltage-stabilizing applications for AC-DC conversion. Through the bridge rectifier circuit, the alternating current (AC) is rectified into the direct current (DC), so as to provide a relatively stable voltage for the LED module and thus lengthen the service life of the LED module.

FIG. 1 is a schematic diagram illustrating a structure of a conventional alternating current rectifying circuit for driving an LED module. The LED module is connected to a DC output terminal of the alternating current rectifying circuit. The alternating current is rectified by the alternating current rectifying circuit so as to be capable of directly driving the LED module. Referring to FIG. 1, the alternating current rectifying circuit is a bridge rectifier circuit, and includes an alternating current module (AC), a first diode D1, a second diode D2, a third diode D3 and a fourth diode D4.

A positive terminal of the first diode D1 is connected with a negative terminal of the second diode D2, and a negative terminal of the first diode D1 is connected with a negative terminal of the third diode D3 and an input terminal (V+) of an external LED module.

A positive terminal of the second diode D2 is connected with a positive terminal of the fourth diode D4 and an output terminal (V−) of the external LED module.

A positive terminal of the third diode D3 is connected with a negative terminal of the fourth diode D4.

One end (A1) of the alternating current module is connected with the positive terminal of the first diode D1, and the other end (A2) thereof is connected with the positive terminal of the third diode D3.

A cycle of the alternating current includes a positive half cycle and a negative half cycle, wherein the positive half cycle is a time period during which the alternating current ascends to a positive peak value from a zero value and descends from the positive peak value to the zero value; and the negative half cycle is a time period during which the alternating current descends to a negative peak value from the zero value and ascends from the negative peak value to the zero value.

During the positive half cycle of the alternating current, the alternating current outputted from the alternating module passes through the first diode D1, the external LED module and the fourth diode D4 so as to form a current loop for providing working voltage for the external LED module.

During the negative half cycle of the alternating current, the alternating current outputted from the alternating module passes through the third diode D3, the external LED module and the second diode D2 so as to form another current loop for providing working voltage for the external LED module.

From above, in the conventional alternating current rectifying circuit for driving the LED module, the alternating current, after being rectified by the diodes, directly drives the LED module to operate. The alternating current fluctuates periodically, and the LED module has a certain switching-on voltage, i.e., only when the voltage applied across the LED module exceeds the switching-on voltage, the LED module may be turned on and may emit light; and if the voltage applied across the LED module does not exceed the switching-on voltage, the LED module is in a cut-off status, i.e., in a status of not emitting light. Thereby, the voltage which can be provided by the conventional alternating current rectifying circuit to the external LED module when the current loop reverses its current direction is smaller than the switching-on voltage, thus the luminous efficiency of the LED module is relatively low; further, through the rectification by the diodes in the alternating current rectifying circuit, the voltage value outputted to the LED module fluctuates as the fluctuation of the alternating voltage, thereby the stability of the output voltage is relatively low, and obvious flickering phenomenon appears in the LED module, which shortens the service life of the LED module.

SUMMARY

The embodiments of the present disclosure provide an alternating current rectifying circuit for driving an LED module, which improves stability of an output voltage and improves luminous efficiency of the LED module.

The embodiments of the present disclosure also provide an alternating current rectifying method for driving an LED module, which improves stability of an output voltage and improves luminous efficiency of the LED module.

In order to achieve the above purposes, the embodiments of the present disclosure provide an alternating current rectifying circuit for driving an LED module, the alternating current rectifying circuit including: an alternating current module, a positive half cycle rectifying branch, a positive half cycle feeding branch, a negative half cycle rectifying branch, a negative half cycle feeding branch, and an overvoltage protection branch, wherein:

the positive half cycle rectifying branch is configured to, when the alternating current module is in a positive half cycle, rectify an alternating current outputted from the alternating current module, and output the rectified voltage signal to the overvoltage protection branch and an external LED module;

the positive half cycle feeding branch is configured to perform charging according to the alternating current outputted from the alternating current module when the alternating current module is in a negative half cycle; and perform discharging and output the discharged voltage signal to the overvoltage protection branch and the external LED module when the alternating current module is in the positive half cycle;

the negative half cycle rectifying branch is configured to, when the alternating current module is in the negative half cycle, rectify the alternating current outputted from the alternating current module, and output the rectified voltage signal to the overvoltage protection branch and the external LED module;

the negative half cycle feeding branch is configured to perform charging according to the alternating current outputted from the alternating current module when the alternating current module is in the positive half cycle; and perform discharging and output the discharged voltage signal to the overvoltage protection branch and the external LED module when the alternating current module is in the negative half cycle; and the overvoltage protection branch is configured to turn off an electrical path of the external LED module when the inputted voltage signal is higher than a preset voltage threshold.

Preferably, the positive half cycle rectifying branch includes a first rectifying tube, a second rectifying tube and a sixth rectifying tube, wherein:

a positive terminal of the second rectifying tube is connected with one end of the alternating current module, and a negative terminal of the second rectifying tube is connected with a positive terminal of the first rectifying tube;

a negative terminal of the first rectifying tube is connected with an input terminal of the external LED module;

a positive terminal of the sixth rectifying tube is connected with an output terminal of the external LED module, and a negative terminal of the sixth rectifying tube is connected with the other end of the alternating current module.

Preferably, the negative half cycle rectifying branch includes a third rectifying tube, a fourth rectifying tube and a fifth rectifying tube, wherein:

a negative terminal of the third rectifying tube is connected with the one end of the alternating current module, and a positive terminal of the third rectifying tube is connected with the output terminal of the external LED module;

a positive terminal of the fifth rectifying tube is connected with the other end of the alternating current module, and a negative terminal of the fifth rectifying tube is connected with a positive terminal of the fourth rectifying tube; and a negative terminal of the fourth rectifying tube is connected with the input terminal of the external LED module.

Preferably, the positive half cycle feeding branch includes a first capacitor and a fourth capacitor, wherein:

one end of the first capacitor is connected with the positive terminal of the fourth rectifying tube, and the other end of the first capacitor is connected with the one end of the alternating current module; and one end of the fourth capacitor is connected with the other end of the alternating current module, and the other end of the fourth capacitor is connected with the output terminal of the external LED module.

Preferably, the negative half cycle feeding branch includes a second capacitor and a third capacitor, wherein:

one end of the second capacitor is connected with the one end of the alternating current module, and the other end of the second capacitor is connected with the output terminal of the external LED module; and one end of the third capacitor is connected with the positive terminal of the first rectifying tube, and the other end of the third capacitor is connected with the other end of the alternating current module.

Preferably, the overvoltage protection branch includes a first resistor, a second resistor, a third resistor, a fourth resistor, a fifth resistor, a first Zener diode, a second Zener diode, a NPN transistor and a field effect transistor, wherein:

one end of the first resistor is connected with one end of the fourth resistor and the input terminal of the LED module, and the other end of the first resistor is connected with one end of the second resistor, a negative terminal of the first Zener diode and one end of the third resistor;

the other end of the third resistor is connected with a base of the NPN transistor;

the other end of the fourth resistor is connected with a collector of the NPN transistor, one end of the fifth resistor and a negative terminal of the second Zener diode;

the other end of the fifth resistor is connected with a gate of the field effect transistor;

a drain of the field effect transistor is connected with the output terminal of the LED module; and a source of the field effect transistor is connected with the other end of the second resistor, a positive terminal of the first Zener diode, an emitter of the NPN transistor, a positive terminal of the second Zener diode and a positive terminal of the third rectifying tube.

Preferably, the rectifying tubes are diodes, transistors or silicon controlled rectifiers.

Preferably, the first capacitor, the second capacitor, the third capacitor and the fourth capacitor are non-polar capacitors.

Preferably, the first capacitor, the second capacitor, the third capacitor and the fourth capacitor have the same capacitance value.

Preferably, during the positive half cycle of the alternating current, the current passes through the second rectifying tube, the first rectifying tube, the LED module and the sixth rectifying tube to form a loop so as to supply power to the LED module, and output the rectified voltage signal to the overvoltage protection branch, and the overvoltage protection branch determines whether to turn off the electrical path of the LED module according to the inputted voltage signal and the preset voltage threshold, wherein:

during an ascending stage of voltage of the alternating current, the alternating current passes through the second rectifying tube and the third capacitor to form a loop so as to charge the third capacitor; meanwhile, the alternating current passes through the second capacitor and the sixth rectifying tube to form a loop so as to charge the second capacitor; meanwhile, the fourth capacitor, the first capacitor, the fourth rectifying tube and the LED module form a loop so as to supply power to the LED module;

during the negative half cycle of the alternating current, the current passes through the fifth diode, the fourth rectifying tube, the LED module and the third rectifying tube to form a loop so as to supply power to the LED module, and output the rectified voltage signal to the overvoltage protection branch, and the overvoltage protection branch determines whether to turn off the electrical path of the LED module according to the inputted voltage signal and the preset voltage threshold, wherein:

during an ascending stage of an absolute value of voltage, the alternating current in the alternating current module passes through the fifth rectifying tube and the first capacitor to form a loop so as to charge the first capacitor; meanwhile, the alternating current passes through the fourth capacitor and the third rectifying tube to form a loop so as to charge the fourth capacitor; meanwhile, the second capacitor, the third capacitor, the first rectifying tube and the LED module form a loop so as to supply power to the LED module.

Preferably, the alternating current rectifying circuit further includes: a current regulative diode with a positive terminal connected with the source of the field effect transistor and a negative terminal connected with the positive terminal of the third rectifying tube.

Preferably, the alternating current rectifying circuit further includes: an electrolytic capacitor with a positive terminal connected with the input terminal of the LED module and a negative terminal connected with the output terminal of the LED module.

An alternating current rectifying method for driving a light emitting diode LED module is provided, wherein the LED module is driven by an alternating current rectifying circuit and the alternating current rectifying circuit includes: an alternating current module, a positive half cycle rectifying branch, a positive half cycle feeding branch, a negative half cycle rectifying branch, a negative half cycle feeding branch, and an overvoltage protection branch, the method including:

when the alternating current module is in a positive half cycle, the positive half cycle rectifying branch rectifies an alternating current outputted from the alternating current module, and outputs the rectified voltage signal to the overvoltage protection branch and an external LED module;

the negative half cycle feeding branch performs charging according to the alternating current outputted from the alternating current module, and the positive half cycle feeding branch performs discharging and outputs the discharged voltage signal to the overvoltage protection branch and the external LED module;

the overvoltage protection branch turns off an electrical path of the external LED module when the inputted voltage signal is higher than a preset voltage threshold;

when the alternating current module is in the negative half cycle, the negative half cycle rectifying branch rectifies the alternating current outputted from the alternating current module, and outputs the rectified voltage signal to the overvoltage protection branch circuit and the external LED module;

the negative half cycle feeding branch performs discharging, and outputs the discharged voltage signal to the overvoltage protection branch and the external LED module, and the positive half cycle feeding branch performs charging according to the alternating current outputted from the alternating current module; and the overvoltage protection branch turns off the electrical path of the external LED module when the inputted voltage signal is higher than the preset voltage threshold.

The positive half cycle rectifying branch includes a first rectifying tube, a second rectifying tube and a sixth rectifying tube, wherein:

a positive terminal of the second rectifying tube is connected with one end of the alternating current module, and a negative terminal of the second rectifying tube is connected with a positive terminal of the first rectifying tube;

a negative terminal of the first rectifying tube is connected with an input terminal of the external LED module; and a positive terminal of the sixth rectifying tube is connected with an output terminal of the external LED module, and a negative terminal of the sixth rectifying tube is connected with the other end of the alternating current module.

The negative half cycle rectifying branch includes a third rectifying tube, a fourth rectifying tube and a fifth rectifying tube, wherein:

a negative terminal of the third rectifying tube is connected with the one end of the alternating current module, and a positive terminal of the third rectifying tube is connected with the output terminal of the external LED module;

a positive terminal of the fifth rectifying tube is connected with the other end of the alternating current module, and a negative terminal of the fifth rectifying tube is connected with a positive terminal of the fourth rectifying tube; and a negative terminal of the fourth rectifying tube is connected with the input terminal of the external LED module.

The positive half cycle feeding branch includes a first capacitor and a fourth capacitor, wherein:

one end of the first capacitor is connected with the positive terminal of the fourth rectifying tube, and the other end of the first capacitor is connected with the one end of the alternating current module; and one end of the fourth capacitor is connected with the other end of the alternating current module, and the other end of the fourth capacitor is connected with the output terminal of the external LED module.

The negative half cycle feeding branch includes a second capacitor and a third capacitor, wherein:

one end of the second capacitor is connected with the one end of the alternating current module, and the other end of the second capacitor is connected with the output terminal of the external LED module; and one end of the third capacitor is connected with the positive terminal of the first rectifying tube, and the other end of the third capacitor is connected with the other end of the alternating current module.

The overvoltage protection branch includes a first resistor, a second resistor, a third resistor, a fourth resistor, a fifth resistor, a first Zener diode, a second Zener diode, a NPN transistor and a field effect transistor, wherein:

one end of the first resistor is connected with one end of the fourth resistor and the input terminal of the LED module, and the other end of the first resistor is connected with one end of the second resistor, a negative terminal of the first Zener diode and one end of the third resistor;

the other end of the third resistor is connected with a base of the NPN transistor;

the other end of the fourth resistor is connected with a collector of the NPN transistor, one end of the fifth resistor and a negative terminal of the second Zener diode;

the other end of the fifth resistor is connected with a gate of the field effect transistor;

a drain of the field effect transistor is connected with the output terminal of the LED module; and a source of the field effect transistor is connected with the other end of the second resistor, a positive terminal of the first Zener diode, an emitter of the NPN transistor, a positive terminal of the second Zener diode and a positive terminal of the third rectifying tube.

The rectifying tubes are diodes, during the positive half cycle of the alternating current, the current passes through the second diode, the first diode, the LED module and the sixth diode to form a loop so as to supply power to the LED module, and output the rectified voltage signal to the overvoltage protection branch, and the overvoltage protection branch determines whether to turn off the electrical path of the LED module according to the inputted voltage signal and the preset voltage threshold, wherein:

during an ascending stage of voltage of the alternating current, the alternating current passes through the second diode and the third capacitor to form a loop so as to charge the third capacitor; meanwhile, the alternating current passes through the second capacitor and the sixth diode to form a loop so as to charge the second capacitor; meanwhile, the fourth capacitor, the first capacitor, the fourth diode and the LED module form a loop so as to supply power to the LED module;

during the negative half cycle of the alternating current, the current passes through the fifth diode, the fourth diode, the LED module and the third diode to form a loop so as to supply power to the LED module, and output the rectified voltage signal to the overvoltage protection branch, and the overvoltage protection branch determines whether to turn off the electrical path of the LED module according to the inputted voltage signal and the preset voltage threshold, wherein:

during an ascending stage of an absolute value of voltage, the alternating current in the alternating current module passes through the fifth diode and the first capacitor to form a loop so as to charge the first capacitor; meanwhile, the alternating current passes through the fourth capacitor and the third diode to form a loop so as to charge the fourth capacitor; meanwhile, the second capacitor, the third capacitor, the first diode and the LED module form a loop so as to supply power to the LED module.

It can be seen from the above technical solutions, the alternating current rectifying circuit and the alternating current rectifying method for driving a light emitting diode LED module provided by the embodiments of the present disclosure include: an alternating current module, a positive half cycle rectifying branch, a positive half cycle feeding branch, a negative half cycle rectifying branch, a negative half cycle feeding branch, and an overvoltage protection branch, wherein: the positive half cycle rectifying branch is configured to rectify an alternating current outputted from the alternating current module and output the rectified voltage signal to the overvoltage protection branch and an external LED module when the alternating current module is in a positive half cycle; the positive half cycle feeding branch is configured to perform charging according to the alternating current outputted from the alternating current module when the alternating current module is in a negative half cycle; and perform discharging and output the discharged voltage signal to the overvoltage protection branch and the external LED module when the alternating current module is in the positive half cycle; the negative half cycle rectifying branch is configured to rectify the alternating current outputted from the alternating current module and output the rectified voltage signal to the overvoltage protection branch and the external LED module when the alternating current module is in the negative half cycle; the negative half cycle feeding branch is configured to perform charging according to the alternating current outputted from the alternating current module when the alternating current module is in the positive half cycle; and perform discharging and output the discharged voltage signal to the overvoltage protection branch and the external LED module when the alternating current module is in the negative half cycle; and the overvoltage protection branch is configured to turn off an electrical path of the external LED module when the inputted voltage signal is higher than a preset voltage threshold. In this way, on the basis of the conventional circuit in which the alternating current directly drives the LED module, by utilizing the charging and discharging of the capacitors, the stability of the output voltage is improved, the utilization rate of each half cycle of the alternating current is improved, the conduction time of the LED is increased, the fluctuation of light emitted by the LED is reduced, the relatively high power factor is ensured, and the luminous efficiency of the LED module is improved.

BRIEF DESCRIPTION OF THE DRAWINGS

In order to explain the technical solutions in the embodiments of the present disclosure or in the prior art more clearly, the drawings necessary for describing the embodiments or the prior art will be simply introduced below. Apparently, the drawings in the following description only illustrate some embodiments of the present disclosure, for the person skilled in the art, other embodiments and drawings may also be obtained according to the embodiments shown in these drawings.

FIG. 5 is a schematic diagram illustrating further another detailed structure of an alternating current rectifying circuit for driving an LED module according to an embodiment of the present disclosure.

FIG. 6 is a flow chart of an alternating current rectifying method for driving an LED module according to an embodiment of the present disclosure.

DETAILED DESCRIPTION

Hereinafter, the technical solutions of respective embodiments in the present disclosure will be described clearly and completely in combination with the accompanying drawings. Apparently, the described embodiments are only part of the embodiments of the present disclosure, rather than all of the embodiments. Based on the embodiments in the preset disclosure, all the other embodiments which could be obtained by the person skilled in the art without paying inventive labor belong to the scope protected by the present disclosure.

In the conventional alternating current rectifying circuit for driving the LED module, since the alternating current fluctuates periodically, and the LED module has a certain switching-on voltage, the voltage which can be provided to the external LED module when the current loop turns its direction is smaller than the switching-on voltage, thus the luminous efficiency of the LED module is relatively low; further, through the rectification by the diodes in the alternating current rectifying circuit, the voltage value outputted to the LED module fluctuates as the fluctuation of the alternating voltage, thereby the stability of the output voltage is relatively low, which influences the service life of the LED module.

With respect to the deficiencies in the prior art in which the alternating current directly drives the circuit, the embodiments of the present disclosure provide a driving circuit for directly driving the LED module by using an alternating current which provides a driving current for the LED module, i.e., charging and discharging of capacitors are used to increase a conduction angle and fill a trough of the alternating current, so as to improve efficiency of power supply and reduce flickering phenomenon in the LED.

Figure 1:
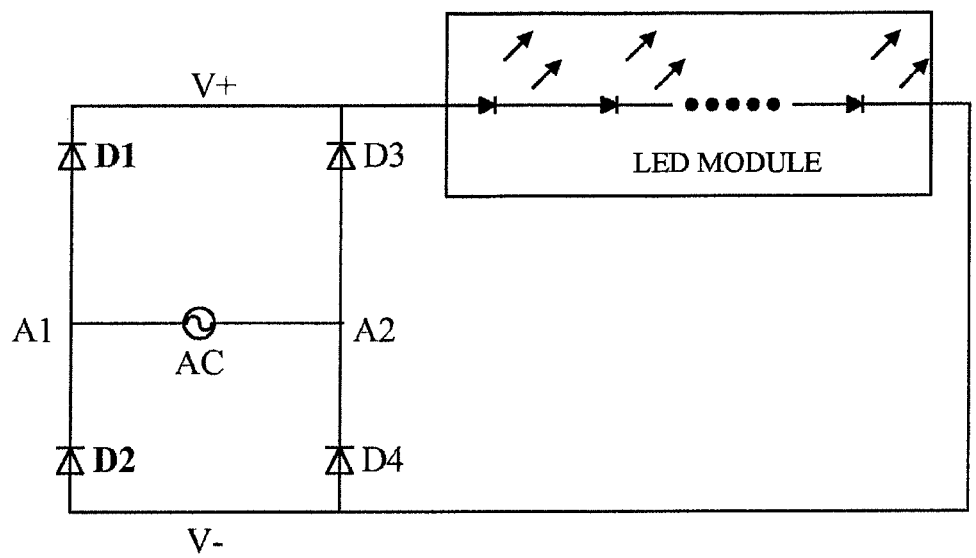
FIG. 1 is a schematic diagram illustrating a structure of a conventional alternating current rectifying circuit for driving an LED module.
Figure 2:
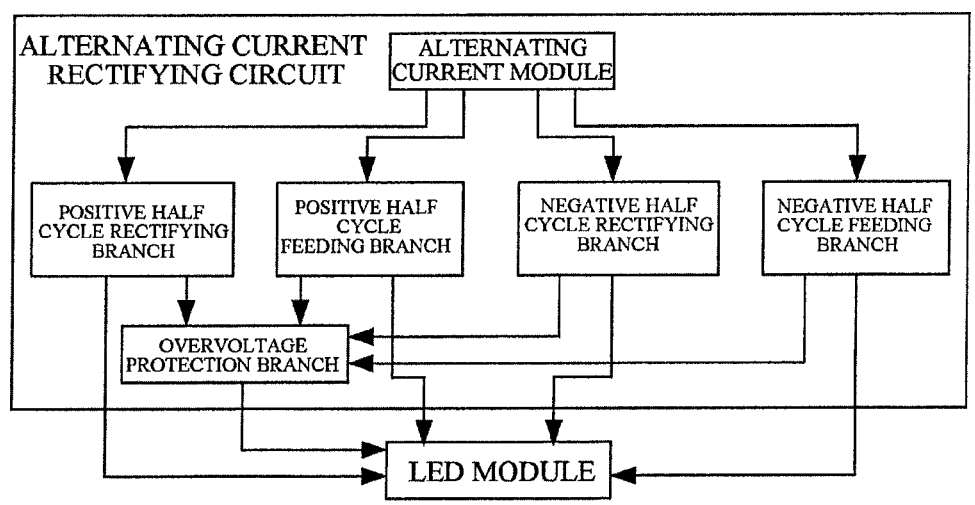
FIG. 2 is a schematic diagram illustrating a structure of an alternating current rectifying circuit for driving an LED module according to an embodiment of the present disclosure.

FIG. 2 is a schematic diagram illustrating a structure of an alternating current rectifying circuit for driving an LED module according to an embodiment of the present disclosure. Referring to FIG. 2, the alternating current rectifying circuit includes: an alternating current module, a positive half cycle rectifying branch, a positive half cycle feeding branch, a negative half cycle rectifying branch, a negative half cycle feeding branch, and an overvoltage protection branch, wherein:

the positive half cycle rectifying branch rectifies an alternating current outputted from the alternating current module and outputs the rectified voltage signal to the overvoltage protection branch and an external LED module when the alternating current module is in a positive half cycle;

the positive half cycle feeding branch performs charging according to the alternating current outputted from the alternating current module when the alternating current module is in a negative half cycle; and performs discharging and outputs the discharged voltage signal to the overvoltage protection branch and the external LED module when the alternating current module is in the positive half cycle;

the negative half cycle rectifying branch rectifies the alternating current outputted from the alternating current module and outputs the rectified voltage signal to the overvoltage protection branch and the external LED module when the alternating current module is in the negative half cycle;

the negative half cycle feeding branch performs charging according to the alternating current outputted from the alternating current module when the alternating current module is in the positive half cycle; and performs discharging and outputs the discharged voltage signal to the overvoltage protection branch and the external LED module when the alternating current module is in the negative half cycle; and the overvoltage protection branch turns off an electrical path of the external LED module when the inputted voltage signal is higher than a preset voltage threshold.

In the embodiments of the present disclosure, the external LED module may also be other load modules, such as other loads which need to be in a stable working voltage.

The positive half cycle rectifying branch includes a first rectifying tube D1, a second rectifying tube D2 and a sixth rectifying tube D6 (not shown in the drawing), wherein:

a positive terminal of the second rectifying tube D2 is connected with one end (A1) of the alternating current module, and a negative terminal of the second rectifying tube D2 is connected with a positive terminal of the first rectifying tube D1;

a negative terminal of the first rectifying tube D1 is connected with an input terminal of the external LED module;

a positive terminal of the sixth rectifying tube D6 is connected with an output terminal of the external LED module, and a negative terminal of the sixth rectifying tube D6 is connected with the other end (A2) of the alternating current module.

The negative half cycle rectifying branch includes a third rectifying tube D3, a fourth rectifying tube D4 and a fifth rectifying tube D5 (not shown in the drawing), wherein:

a negative terminal of the third rectifying tube D3 is connected with the one end (A1) of the alternating current module, and a positive terminal of the third rectifying tube D3 is connected with the output terminal of the external LED module;

a positive terminal of the fifth rectifying tube D5 is connected with the other end (A2) of the alternating current module, and a negative terminal of the fifth rectifying tube D5 is connected with a positive terminal of the fourth rectifying tube D4;

a negative terminal of the fourth rectifying tube D4 is connected with the input terminal of the external LED module.

The positive half cycle feeding branch includes a first capacitor C1 and a fourth capacitor C4 (not shown in the drawing), wherein:

one end of the first capacitor C1 is connected with the positive terminal of the fourth rectifying tube D4, and the other end of the first capacitor C1 is connected with the one end (A1) of the alternating current module;

one end of the fourth capacitor C4 is connected with the other end (A2) of the alternating current module, and the other end of the fourth capacitor C4 is connected with the output terminal of the external LED module.

The negative half cycle feeding branch includes a second capacitor C2 and a third capacitor C3 (not shown in the drawing), wherein:

one end of the second capacitor C2 is connected with the one end (A1) of the alternating current module, and the other end of the second capacitor C2 is connected with the output terminal of the external LED module;

one end of the third capacitor C3 is connected with the positive terminal of the first rectifying tube D1, and the other end of the third capacitor C3 is connected with the other end (A2) of the alternating current module.

The overvoltage protection branch includes a first resistor R1, a second resistor R2, a third resistor R3, a fourth resistor R4, a fifth resistor R5, a first Zener diode DZ1, a second Zener diode DZ2, a NPN transistor Q1 and a field effect transistor M1 (not shown in the drawing), wherein:

one end of the first resistor R1 is connected with one end of the fourth resistor R4 and the input terminal of the LED module, and the other end of the first resistor R1 is connected with one end of the second resistor R2, a negative terminal of the first Zener diode DZ1 and one end of the third resistor R3;

the other end of the third resistor R3 is connected with a base of the NPN transistor Q1;

the other end of the fourth resistor R4 is connected with a collector of the NPN transistor Q1, one end of the fifth resistor R5 and a negative terminal of the second Zener diode DZ2;

the other end of the fifth resistor R5 is connected with a gate of the field effect transistor M1;

a drain of the field effect transistor M1 is connected with the output terminal of the LED module;

a source of the field effect transistor M1 is connected with the other end of the second resistor R2, a positive terminal of the first Zener diode DZ1, an emitter of the NPN transistor Q1, a positive terminal of the second Zener diode DZ1 and a positive terminal of the third rectifying tube D3.

In the embodiments of the present disclosure, the first resistor R1, the second resistor R2, the third resistor R3, the fourth resistor R4, the fifth resistor R5, the first Zener diode DZ1, the second Zener diode DZ2, the NPN transistor Q1 and the field effect transistor M1 constitute the overvoltage protection circuit. When the inputted voltage is higher than the preset voltage threshold, the electronic path of the external LED module is turned off, i.e., the field effect transistor M1 is turned off, and the current is cut off, so as to effectively protect the LED module and the entire circuit from being damaged and greatly improve the reliability of the circuit.

In actual applications, the voltage threshold may be set according to actual requirements. By setting the resistances of the first resistor R1 and the second resistor R2, the voltage threshold may be determined by the voltage divided by the first resistor R1 and the second resistor R2.

Preferably, the rectifying tubes may diodes, or may be transistors, or may be any devices having a unidirectional conductive characteristic, such as silicon controlled rectifiers. The semiconductor rectifier diode is preferably adopted, since the semiconductor rectifier diode has a low cost, and is convenient to be secondarily integrated with the LED module to constitute an integrated LED illumination device directly driven by the alternating current.

For example, the diode is used as the rectifying tube. In this case, the detailed explanation of the embodiments of the present disclosure will be given below.

Figure 3:
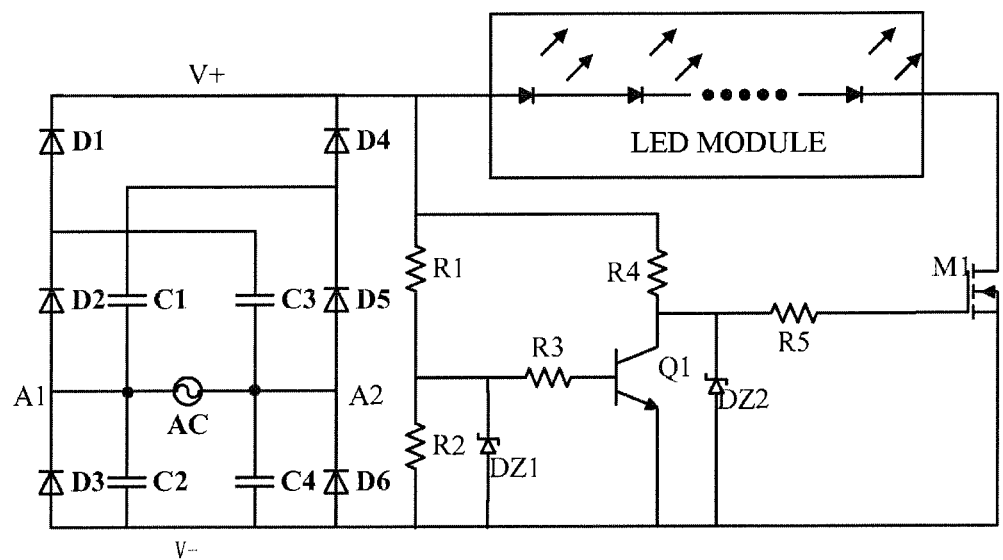
FIG. 3 is a schematic diagram illustrating a detailed structure of an alternating current rectifying circuit for driving an LED module according to an embodiment of the present disclosure.

FIG. 3 is a schematic diagram illustrating a detailed structure of an alternating current rectifying circuit for driving an LED module according to an embodiment of the present disclosure. Referring to FIG. 3, the alternating current rectifying circuit for driving an LED module includes: a first diode D1, a second diode D2, a third diode D3, a fourth diode D4, a fifth diode D5, a sixth diode D6, a first capacitor C1, a second capacitor C2, a third capacitor C3, a fourth capacitor C4, an LED module, a first resistor R1, a second resistor R2, a third resistor R3, a fourth resistor R4, a fifth resistor R5, a first Zener diode DZ1, a second Zener diode DZ2, a NPN transistor Q1 and a field effect transistor M1, wherein:

a positive terminal of the second diode D2 is connected with one end (A1) of the alternating current module, and a negative terminal of the second diode D2 is connected with a positive terminal of the first diode D1 and one end of the third capacitor C3;

a negative terminal of the first diode D1 is connected with a negative terminal of the fourth diode D4 and an input terminal (V+) of an external LED module;

the other end of the third capacitor C3 is connected with the other end (A2) of the alternating current module.

a positive terminal of the fourth diode D4 is connected with a negative terminal of the fifth diode D5 and one end of the first capacitor C1;

the other end of the first capacitor C1 is connected with the one end (A1) of the alternating current module;

a positive terminal of the fifth diode tube D5 is connected with a negative terminal of the sixth diode D6, one end of the fourth capacitor C4 and the other end (A2) of the alternating current module;

a negative terminal of the third diode D3 is connected with the one end of the second capacitor C2 and the one end (A1) of the alternating current module;

an output terminal (V−) of the LED module is connected with a positive terminal of the third diode D3, the other end of the second capacitor C2, the other end of the fourth capacitor C4, and a positive terminal of the sixth diode D6;

one end of the first resistor R1 is connected with one end of the fourth resistor R4 and the input terminal of the LED module, the other end of the first resistor R1 is connected with one end of the second resistor R2, a negative terminal of the first Zener diode DZ1 and one end of the third resistor R3;

the other end of the third resistor R3 is connected with a base of the NPN transistor Q1;

the other end of the fourth resistor R4 is connected with a collector of the NPN transistor Q1, one end of the fifth resistor R5 and a negative terminal of the second Zener diode DZ2;

the other end of the fifth resistor R5 is connected with a gate of the field effect transistor M1;

a drain of the field effect transistor M1 is connected with the output terminal of the LED module;

a source of the field effect transistor M1 is connected with the other end of the second resistor R2, a positive terminal of the first Zener diode DZ1, an emitter of the NPN transistor Q1, a positive terminal of the second Zener diode DZ2 and a positive terminal of the third diode D3.

In the embodiments of the present disclosure, the first capacitor C1, the second capacitor C2, the third capacitor C3 and the fourth capacitor C4 operate in an alternating state, and need to endure an inverse voltage. Preferably, the first capacitor C1, the second capacitor C2, the third capacitor C3 and the fourth capacitor C4 are non-polar capacitors, so as to be adaptable to the alternating working circumstance. The alternating withstanding voltage value of the non-polar capacitor should be greater than or at least equal to the alternating input voltage value.

Preferably, the first capacitor C1, the second capacitor C2, the third capacitor C3 and the fourth capacitor C4 have the same or similar capacitance value.

Hereinafter, the operational principle of the circuit in the embodiments of the present disclosure will be described:

during the positive half cycle of the alternating current, current passes through the second diode D2, the first diode D1, the LED module and the sixth diode D6 to form a loop so as to supply power to the LED module, and output the rectified voltage signal to the overvoltage protection branch, and the overvoltage protection branch determines whether to turn off the electrical path of the LED module according to the inputted voltage signal and the preset voltage threshold, wherein:

during an ascending stage of the alternating current voltage, the alternating current passes through the second diode D2 and the third capacitor C3 to form a loop so as to charge the third capacitor C3; meanwhile, the alternating current passes through the second capacitor C2 and the sixth diode D6 to form a loop so as to charge the second capacitor C2; meanwhile, the fourth capacitor C4, the first capacitor C1, the fourth diode D4 and the LED module form a loop so as to supply power to the LED module, i.e., electric charges stored in the first capacitor C1 and the fourth capacitor C4 are discharged to the LED module through the fourth diode D4, so as to provide the working voltage for the LED module.

In the embodiments of the present disclosure, during the ascending stage of the alternating current voltage, in the circuit structure, the second capacitor C2 and the third capacitor C3 are connected in parallel, the first capacitor C1 and the fourth capacitor C4 are connected with the alternating current module in series so as to supply power to the LED module, such that the voltage of the alternating current is increased when the alternating current module initially supplies power or switches the positive and negative half cycles, so as to enable the LED module to be turned on in advance, in this way, the quality factor of the circuit is improved, the stability of the output voltage is improved, the luminous efficiency of the LED module is improved, and the service life of the LED module is prolonged.

During the negative half cycle of the alternating current, current passes through the fifth diode D5, the fourth diode D4, the LED module and the third diode D3 to form a loop so as to supply power to the LED module, and output the rectified voltage signal to the overvoltage protection branch, and the overvoltage protection branch determines whether to turn off the electrical path of the LED module according to the inputted voltage signal and the preset voltage threshold, wherein:

during an ascending stage of an absolute value of voltage, the alternating current in the alternating current module passes through the fifth diode D5 and the first capacitor C1 to form a loop so as to charge the first capacitor C1; meanwhile, the alternating current passes through the fourth capacitor C4 and the third diode D3 to form a loop so as to charge the fourth capacitor C4; meanwhile, the second capacitor C2, the third capacitor C3, the first diode D1 and the LED module form a loop so as to supply power to the LED module, i.e., electric charges stored in the second capacitor C2 and the third capacitor C3 are discharged to the LED module through the first diode D1, so as to provide the working voltage for the LED module.

In the embodiments of the present disclosure, during the charging process in the ascending stage of the alternating current voltage, in the circuit structure, the first capacitor C1 and the fourth capacitor C4 are connected in parallel, the second capacitor C2 and the third capacitor C3 are connected with the alternating current module in series, such that the absolute value of voltage of the alternating current is increased when switching the alternating current, so as to enable the LED module to be turned on in advance.

In the embodiments of the present disclosure, through the alternative charging and discharging of the first capacitor C1, the second capacitor C2, the third capacitor C3 and the fourth capacitor C4 during the positive and negative half cycles of the alternating current, the voltage value outputted to the LED module becomes relatively stable, and the flickering frequency of the LED module when emitting light is reduced; meanwhile, the turn-on time of the LED module within the positive and negative half cycles of the alternating current is increased, the fluctuation of light emitted by the LED module is reduced, and the power factor of the circuit is improved. Further, the circuit in the embodiments of the present disclosure has a simple structure, has a high efficiency of power supply, and is very suitable for the illumination device in which the LED module is directly driven by the alternating current.

In actual applications, in order to ensure that a difference between the output currents of the alternating current within the positive and negative half cycles is small, in FIGS. 2 and 3, the equivalent resistances of respective branches should be the same or similar, i.e., diode parameters in respective branches should be the same or similar, and respective capacitors should also have the same or similar capacitances. For example, the diode parameters in the positive half cycle rectifying branch should be the same as or similar with the diode parameters in the negative half cycle rectifying branch; and the capacitance in the positive half cycle feeding branch should be the same as or similar with the capacitance in the negative half cycle feeding branch.

In the embodiments of the present disclosure, selecting the capacitors having the same or similar parameters brings benefit to improve the electrical balance, and also brings benefit to balance the load, reduce the flickering and improve efficiency of power supply. In the embodiments of the present disclosure, the charging and discharging characteristic of the capacitor is mainly utilized, thereby the capacitance (capacitivity) parameters are the most important parameters. By selecting the capacitors having the same or similar capacitances, the charging and discharging characteristics can substantially reach the same or similar level.

Preferably, in order to further improve the stability of the voltage signal outputted to the LED module, the alternating current rectifying circuit for driving an LED module in the embodiments of the present disclosure further includes a current regulative diode (CRD).

Figure 4:
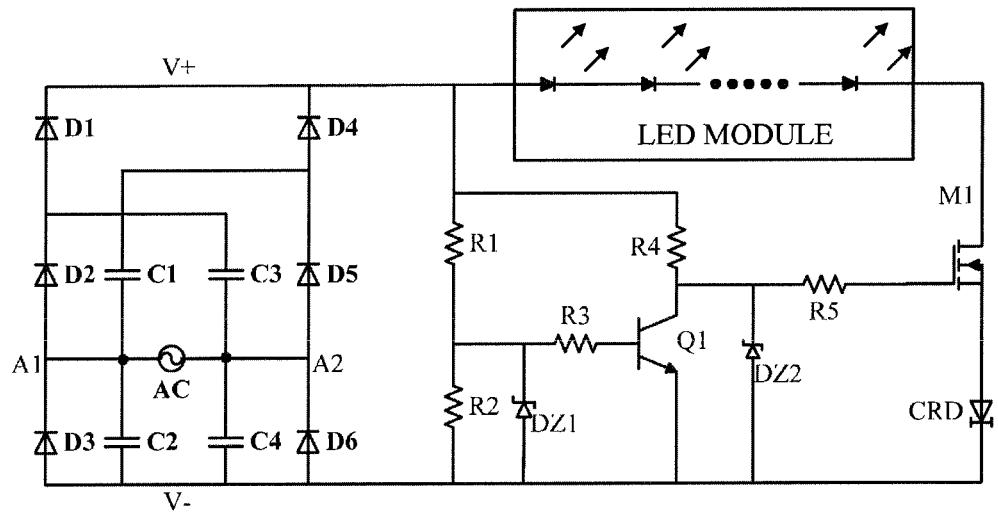
FIG. 4 is a schematic diagram illustrating another detailed structure of an alternating current rectifying circuit for driving an LED module according to an embodiment of the present disclosure.

FIG. 4 is a schematic diagram illustrating another detailed structure of an alternating current rectifying circuit for driving an LED module according to an embodiment of the present disclosure. Referring to FIG. 4, different from FIG. 3, a current regulative diode (CRD) is further included, wherein a positive terminal of the CRD is connected with the source of the field effect transistor M1, and a negative terminal of the CRD is connected with the positive terminal of the third diode D3. In this way, by adding one current regulative diode for limiting current in the DC loop, the luminous efficiency of the LED module can be greatly improved.

In FIG. 3, although the embodiments of the present disclosure can solve the problem of fluctuation of the light outputted from the LED module to a certain extent, the degree of filling the trough of the alternating current is low. The light outputted from the LED module at the trough of the alternating current is only 30%~40% of the light outputted at the peak.

Thereby, a preferable solution of the present disclosure is provided as shown in FIG. 5.

FIG. 5 is a schematic diagram illustrating further another detailed structure of an alternating current rectifying circuit for driving an LED module according to an embodiment of the present disclosure. Referring to FIG. 5, different from FIG. 4, on the basic circuit of the present disclosure, an electrolytic capacitor C5 is added as a filter capacitor, wherein a positive terminal of the electrolytic capacitor C5 is connected with the input terminal of the LED module, and a negative terminal of the electrolytic capacitor C5 is connected with the output terminal of the LED module. Thus, due to filtering function of the electrolytic capacitor C5, the current wave flowing into the LED module is smoother. Although some power factors are sacrificed, the light outputted from the LED module at the trough of the alternating current can reach more than 80% of the light outputted at the peak, thus there is mostly no difference of the sense.

FIG. 6 is a flow chart of an alternating current rectifying method for driving an LED module according to an embodiment of the present disclosure. Referring to FIG. 6, the alternating current rectifying circuit drives a light emitting diode LED module. The current rectifying circuit includes: an alternating current module, a positive half cycle rectifying branch, a positive half cycle feeding branch, a negative half cycle rectifying branch, a negative half cycle feeding branch, and an overvoltage protection branch. The method includes the following steps.

In step 601, when the alternating current module is in a positive half cycle, the positive half cycle rectifying branch rectifies an alternating current outputted from the alternating current module, and outputs the rectified voltage signal to the overvoltage protection branch and an external LED module.

In this step, the positive half cycle rectifying branch includes a first rectifying tube, a second rectifying tube and a sixth rectifying tube, wherein:

a positive terminal of the second rectifying tube is connected with one end of the alternating current module, and a negative terminal of the second rectifying tube is connected with a positive terminal of the first rectifying tube;

a negative terminal of the first rectifying tube is connected with an input terminal of the external LED module;

a positive terminal of the sixth rectifying tube is connected with an output terminal of the external LED module, and a negative terminal of the sixth rectifying tube is connected with the other end of the alternating current module.

The overvoltage protection branch includes a first resistor, a second resistor, a third resistor, a fourth resistor, a fifth resistor, a first Zener diode, a second Zener diode, a NPN transistor and a field effect transistor, wherein:

one end of the first resistor is connected with one end of the fourth resistor and an input terminal of the LED module, and the other end of the first resistor is connected with one end of the second resistor, a negative terminal of the first Zener diode and one end of the third resistor;

the other end of the third resistor is connected with a base of the NPN transistor;

the other end of the fourth resistor is connected with a collector of the NPN transistor, one end of the fifth resistor and a negative terminal of the second Zener diode;

the other end of the fifth resistor is connected with a gate of the field effect transistor;

a drain of the field effect transistor is connected with the output terminal of the LED module;

a source of the field effect transistor is connected with the other end of the second resistor, a positive terminal of the first Zener diode, an emitter of the NPN transistor, a positive terminal of the second Zener diode and a positive terminal of the third rectifying tubes.

In step 602, the negative half cycle feeding branch performs charging according to the alternating current outputted from the alternating current module, and the positive half cycle feeding branch performs discharging and outputs the discharged voltage signal to the overvoltage protection branch and the external LED module.

In this step, the negative half cycle feeding branch includes a second capacitor and a third capacitor, wherein:

one end of the second capacitor is connected with one end of the alternating current module, and the other end of the second capacitor is connected with the output terminal of the external LED module; and one end of the third capacitor is connected with the positive terminal of the first rectifying tube, and the other end of the third capacitor is connected with the other end of the alternating current module.

The positive half cycle feeding branch includes a first capacitor and a fourth capacitor, wherein:

one end of the first capacitor is connected with the positive terminal of the fourth rectifying tube, and the other end of the first capacitor is connected with one end of the alternating current module; and one end of the fourth capacitor is connected with the other end of the alternating current module, and the other end of the fourth capacitor is connected with the output terminal of the external LED module.

In step 603, the overvoltage protection branch turns off an electrical path of the external LED module when the inputted voltage signal is higher than a preset voltage threshold.

In step 604, when the alternating current module is in the negative half cycle, the negative half cycle rectifying branch rectifies the alternating current outputted from the alternating current module, and outputs the rectified voltage signal to the overvoltage protection branch circuit and the external LED module.

In this step, the negative half cycle rectifying branch includes a third rectifying tube, a fourth rectifying tube and a fifth rectifying tube, wherein:

a negative terminal of the third rectifying tube is connected with one end of the alternating current module, and a positive terminal of the third rectifying tube is connected with the output terminal of the external LED module;

a positive terminal of the fifth rectifying tube is connected with the other end of the alternating current module, and a negative terminal of the fifth rectifying tube is connected with a positive terminal of the fourth rectifying tube;

a negative terminal of the fourth rectifying tube is connected with the input terminal of the external LED module.

In step 605, the negative half cycle feeding branch performs discharging, and outputs the discharged voltage signal to the overvoltage protection branch and the external LED module, and the positive half cycle feeding branch performs charging according to the alternating current outputted from the alternating current module.

In step 606, the overvoltage protection branch turns off an electrical path of the external LED module when the inputted voltage signal is higher than the preset voltage threshold.

Thus, in the embodiments of the present disclosure, during the positive half cycle of the alternating current, current passes through the second rectifying tube, the first rectifying tube, the LED module and the sixth rectifying tube to form a loop so as to supply power to the LED module, and output the rectified voltage signal to the overvoltage protection branch, and the overvoltage protection branch determines whether to turn off the electrical path of the LED module according to the inputted voltage signal and the preset voltage threshold, wherein:

during an ascending stage of the alternating current voltage, the alternating current passes through the second rectifying tube and the third capacitor to form a loop so as to charge the third capacitor; meanwhile, the alternating current passes through the second capacitor and the sixth rectifying tube to form a loop so as to charge the second capacitor; meanwhile, the fourth capacitor, the first capacitor, the fourth rectifying tube and the LED module form a loop so as to supply power to the LED module;

during the negative half cycle of the alternating current, current passes through the fifth diode, the fourth rectifying tube, the LED module and the third rectifying tube to form a loop so as to supply power to the LED module, and output the rectified voltage signal to the overvoltage protection branch, and the overvoltage protection branch determines whether to turn off the electrical path of the LED module according to the inputted voltage signal and the preset voltage threshold, wherein:

during an ascending stage of an absolute value of voltage, the alternating current in the alternating current module passes through the fifth rectifying tube and the first capacitor to form a loop so as to charge the first capacitor; meanwhile, the alternating current passes through the fourth capacitor and the third rectifying tube to form a loop so as to charge the fourth capacitor; meanwhile, the second capacitor, the third capacitor, the first rectifying tube and the LED module form a loop so as to supply power to the LED module.

Apparently, the person skilled in the art can make various modifications and changes to the present disclosure without departing from the spirit and scope thereof. Thus, if the modifications and changes to the present disclosure are within the scope of the claims of the present disclosure and its equivalent technique, the present disclosure intends to contain such modifications and changes.

The invention claimed is:

1. An alternating current rectifying circuit for driving a load module, characterized in that, the alternating current rectifying circuit comprises: an alternating current module, a positive half cycle rectifying branch, a positive half cycle feeding branch, a negative half cycle rectifying branch, a negative half cycle feeding branch, and an overvoltage protection branch, wherein:
   the positive half cycle rectifying branch is configured to, when the alternating current module is in a positive half cycle, rectify an alternating current outputted from the alternating current module, and output a rectified voltage signal to the overvoltage protection branch and an external load module;
   the positive half cycle feeding branch is configured to perform charging according to the alternating current outputted from the alternating current module when the alternating current module is in a negative half cycle; and perform discharging and output a discharged voltage signal to the overvoltage protection branch and the external load module when the alternating current module is in the positive half cycle;
   the negative half cycle rectifying branch is configured to, when the alternating current module is in the negative half cycle, rectify the alternating current outputted from the alternating current module, and output a rectified voltage signal to the overvoltage protection branch and the external load module;
   the negative half cycle feeding branch is configured to perform charging according to the alternating current outputted from the alternating current module when the alternating current module is in the positive half cycle; and perform discharging and output a discharged voltage signal to the overvoltage protection branch and the external load module when the alternating current module is in the negative half cycle; and
   the overvoltage protection branch is configured to turn off an electrical path of the external load module when the inputted voltage signal is higher than a preset voltage threshold.

2. The alternating current rectifying circuit according to claim 1, wherein the positive half cycle rectifying branch comprises a first rectifying tube, a second rectifying tube and a sixth rectifying tube, wherein:
   a positive terminal of the second rectifying tube is connected with one end of the alternating current module, and a negative terminal of the second rectifying tube is connected with a positive terminal of the first rectifying tube;
   a negative terminal of the first rectifying tube is connected with an input terminal of the external load module; and
   a positive terminal of the sixth rectifying tube is connected with an output terminal of the external load module, and a negative terminal of the sixth rectifying tube is connected with the other end of the alternating current module.

3. The alternating current rectifying circuit according to claim 2, wherein the negative half cycle rectifying branch comprises a third rectifying tube, a fourth rectifying tube and a fifth rectifying tube, wherein:
   a negative terminal of the third rectifying tube is connected with the one end of the alternating current module, and a positive terminal of the third rectifying tube is connected with the output terminal of the external load module;
   a positive terminal of the fifth rectifying tube is connected with the other end of the alternating current module, and a negative terminal of the fifth rectifying tube is connected with a positive terminal of the fourth rectifying tube; and
   a negative terminal of the fourth rectifying tube is connected with the input terminal of the external load module.

4. The alternating current rectifying circuit according to claim 3, wherein the positive half cycle feeding branch comprises a first capacitor and a fourth capacitor, wherein:
   one end of the first capacitor is connected with the positive terminal of the fourth rectifying tube, and the other end of the first capacitor is connected with the one end of the alternating current module; and
   one end of the fourth capacitor is connected with the other end of the alternating current module, and the other end of the fourth capacitor is connected with the output terminal of the external load module.

5. The alternating current rectifying circuit according to claim 4, wherein the negative half cycle feeding branch comprises a second capacitor and a third capacitor, wherein:
   one end of the second capacitor is connected with the one end of the alternating current module, and the other end of the second capacitor is connected with the output terminal of the external load module; and
   one end of the third capacitor is connected with the positive terminal of the first rectifying tube, and the other end of the third capacitor is connected with the other end of the alternating current module.

6. The alternating current rectifying circuit according to claim 3, wherein the overvoltage protection branch comprises a first resistor, a second resistor, a third resistor, a fourth resistor, a fifth resistor, a first Zener diode, a second Zener diode, a NPN transistor and a field effect transistor, wherein:
   one end of the first resistor is connected with one end of the fourth resistor and the input terminal of the LED module, and the other end of the first resistor is connected with one end of the second resistor, a negative terminal of the first Zener diode and one end of the third resistor;
   the other end of the third resistor is connected with a base of the NPN transistor;
   the other end of the fourth resistor is connected with a collector of the NPN transistor, one end of the fifth resistor and a negative terminal of the second Zener diode;
   the other end of the fifth resistor is connected with a gate of the field effect transistor;
   a drain of the field effect transistor is connected with the output terminal of the load module; and
   a source of the field effect transistor is connected with the other end of the second resistor, a positive terminal of the first Zener diode, an emitter of the NPN transistor, a positive terminal of the second Zener diode and a positive terminal of the third rectifying tube.

7. The alternating current rectifying circuit according to claim 6, wherein the rectifying tubes are diodes, transistors or silicon controlled rectifiers.

8. The alternating current rectifying circuit according to claim 6, wherein the first capacitor, the second capacitor, the third capacitor and the fourth capacitor are non-polar capacitors.

9. The alternating current rectifying circuit according to claim 8, wherein the first capacitor, the second capacitor, the third capacitor and the fourth capacitor have the same capacitance value.

10. The alternating current rectifying circuit according to claim 9, wherein during the positive half cycle of the alternating current, the current passes through the second diode, the first diode, the load module and the sixth diode to form a loop so as to supply power to the load module, and output the rectified voltage signal to the overvoltage protection branch, and the overvoltage protection branch determines whether to turn off the electrical path of the load module according to the inputted voltage signal and the preset voltage threshold, wherein:

during an ascending stage of voltage of the alternating current, the alternating current passes through the second diode and the third capacitor to form a loop so as to charge the third capacitor; meanwhile, the alternating current passes through the second capacitor and the sixth diode to form a loop so as to charge the second capacitor; meanwhile, the fourth capacitor, the first capacitor, the fourth diode and the load module form a loop so as to supply power to the load module;

during the negative half cycle of the alternating current, the current passes through the fifth diode, the fourth diode, the load module and the third diode to form a loop so as to supply power to the load module, and output the rectified voltage signal to the overvoltage protection branch, and the overvoltage protection branch determines whether to turn off the electrical path of the load module according to the inputted voltage signal and the preset voltage threshold, wherein:

during an ascending stage of an absolute value of voltage, the alternating current in the alternating current module passes through the fifth diode and the first capacitor to form a loop so as to charge the first capacitor; meanwhile, the alternating current passes through the fourth capacitor and the third diode to form a loop so as to charge the fourth capacitor; meanwhile, the second capacitor, the third capacitor, the first diode and the load module form a loop so as to supply power to the load module.

11. The alternating current rectifying circuit according to claim 10, further comprising: a current regulative diode with a positive terminal connected with the source of the field effect transistor and a negative terminal connected with the positive terminal of the third diode.

12. The alternating current rectifying circuit according to claim 11, further comprising: an electrolytic capacitor with a positive terminal connected with the input terminal of the load module and a negative terminal connected with the output terminal of the load module.

13. An alternating current rectifying method for driving a load module, wherein the load module is driven by an alternating current rectifying circuit and the alternating current rectifying circuit comprises: an alternating current module, a positive half cycle rectifying branch, a positive half cycle feeding branch, a negative half cycle rectifying branch, a negative half cycle feeding branch, and an overvoltage protection branch, the method comprising the steps of:

when the alternating current module is in a positive half cycle, rectifying by the positive half cycle rectifying branch an alternating current outputted from the alternating current module, and outputting a rectified voltage signal to the overvoltage protection branch and an external load module;

performing by the negative half cycle feeding branch charging according to the alternating current outputted from the alternating current module, and performing by the positive half cycle feeding branch discharging and outputting a discharged voltage signal to the overvoltage protection branch and the external load module; and turning off by the overvoltage protection branch an electrical path of the external load module when the inputted voltage signal is higher than a preset voltage threshold; and when the alternating current module is in the negative half cycle, rectifying by the negative half cycle rectifying branch the alternating current outputted from the alternating current module, and outputting a rectified voltage signal to the overvoltage protection branch circuit and the external load module;

performing by the negative half cycle feeding branch discharging, and outputting a discharged voltage signal to the overvoltage protection branch and the external load module, and performing by the positive half cycle feeding branch charging according to the alternating current outputted from the alternating current module; and turning off by the overvoltage protection branch the electrical path of the external load module when the inputted voltage signal is higher than the preset voltage threshold.

14. The alternating current rectifying method according to claim 13, wherein the positive half cycle rectifying branch comprises a first rectifying tube, a second rectifying tube and a sixth rectifying tube, wherein:

a positive terminal of the second rectifying tube is connected with one end of the alternating current module, and a negative terminal of the second rectifying tube is connected with a positive terminal of the first rectifying tube;

a negative terminal of the first rectifying tube is connected with an input terminal of the external load module; and a positive terminal of the sixth rectifying tube is connected with an output terminal of the external load module, and a negative terminal of the sixth rectifying tube is connected with the other end of the alternating current module.

15. The alternating current rectifying method according to claim 14, wherein the negative half cycle rectifying branch comprises a third rectifying tube, a fourth rectifying tube and a fifth rectifying tube, wherein:

a negative terminal of the third rectifying tube is connected with the one end of the alternating current module, and a positive terminal of the third rectifying tube is connected with the output terminal of the external load module;

a positive terminal of the fifth rectifying tube is connected with the other end of the alternating current module, and a negative terminal of the fifth rectifying tube is connected with a positive terminal of the fourth rectifying tube; and a negative terminal of the fourth rectifying tube is connected with the input terminal of the external load module.

16. The alternating current rectifying method according to claim 15, wherein the positive half cycle feeding branch comprises a first capacitor and a fourth capacitor, wherein:
one end of the first capacitor is connected with the positive terminal of the fourth rectifying tube, and the other end of the first capacitor is connected with the one end of the alternating current module; and
one end of the fourth capacitor is connected with the other end of the alternating current module, and the other end of the fourth capacitor is connected with the output terminal of the external load module.

17. The alternating current rectifying method according to claim 16, wherein the negative half cycle feeding branch comprises a second capacitor and a third capacitor, wherein:
one end of the second capacitor is connected with the one end of the alternating current module, and the other end of the second capacitor is connected with the output terminal of the external load module; and
one end of the third capacitor is connected with the positive terminal of the first rectifying tube, and the other end of the third capacitor is connected with the other end of the alternating current module.

18. The alternating current rectifying method according to claim 15, wherein the overvoltage protection branch comprises a first resistor, a second resistor, a third resistor, a fourth resistor, a fifth resistor, a first Zener diode, a second Zener diode, a NPN transistor and a field effect transistor, wherein:
one end of the first resistor is connected with one end of the fourth resistor and the input terminal of the load module, and the other end of the first resistor is connected with one end of the second resistor, a negative terminal of the first Zener diode and one end of the third resistor;
the other end of the third resistor is connected with a base of the NPN transistor;
the other end of the fourth resistor is connected with a collector of the NPN transistor, one end of the fifth resistor and a negative terminal of the second Zener diode;
the other end of the fifth resistor is connected with a gate of the field effect transistor;
a drain of the field effect transistor is connected with the output terminal of the load module; and
a source of the field effect transistor is connected with the other end of the second resistor, a positive terminal of the first Zener diode, an emitter of the NPN transistor, a positive terminal of the second Zener diode and a positive terminal of the third rectifying tube.

19. The alternating current rectifying method according to claim 18, wherein the rectifying tubes are diodes, during the positive half cycle of the alternating current, the current passes through the second diode, the first diode, the load module and the sixth diode to form a loop so as to supply power to the load module, and output the rectified voltage signal to the overvoltage protection branch, and the overvoltage protection branch determines whether to turn off the electrical path of the load module according to the inputted voltage signal and the preset voltage threshold, wherein:
during an ascending stage of voltage of the alternating current, the alternating current passes through the second diode and the third capacitor to form a loop so as to charge the third capacitor; meanwhile, the alternating current passes through the second capacitor and the sixth diode to form a loop so as to charge the second capacitor; meanwhile, the fourth capacitor, the first capacitor, the fourth diode and the load module form a loop so as to supply power to the load module;
during the negative half cycle of the alternating current, the current passes through the fifth diode, the fourth diode, the load module and the third diode to form a loop so as to supply power to the load module, and output the rectified voltage signal to the overvoltage protection branch, and the overvoltage protection branch determines whether to turn off the electrical path of the load module according to the inputted voltage signal and the preset voltage threshold, wherein:
during an ascending stage of an absolute value of voltage, the alternating current in the alternating current module passes through the fifth diode and the first capacitor to form a loop so as to charge the first capacitor; meanwhile, the alternating current passes through the fourth capacitor and the third diode to form a loop so as to charge the fourth capacitor; meanwhile, the second capacitor, the third capacitor, the first diode and the load module form a loop so as to supply power to the load module.

20. The alternating current rectifying method according to claim 18, wherein the preset voltage threshold is set by setting the resistances of the first resistor and the second resistor.

* * * * *